US009847901B2

(12) United States Patent
Dhayni

(10) Patent No.: US 9,847,901 B2
(45) Date of Patent: Dec. 19, 2017

(54) OFDM PACKETS TIME SYNCHRONISATION

(71) Applicant: Optis Circuit Technology, LLC, Plano, TX (US)

(72) Inventor: Achraf Dhayni, Vallauris (FR)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 117 days.

(21) Appl. No.: 14/767,960

(22) PCT Filed: Nov. 25, 2013

(86) PCT No.: PCT/EP2013/074623
§ 371 (c)(1),
(2) Date: Aug. 14, 2015

(87) PCT Pub. No.: WO2014/127862
PCT Pub. Date: Aug. 28, 2014

(65) Prior Publication Data
US 2015/0372847 A1   Dec. 24, 2015

(30) Foreign Application Priority Data

Feb. 21, 2013 (EP) .................................. 13305195

(51) Int. Cl.
*H04L 27/26* (2006.01)
(52) U.S. Cl.
CPC .......... *H04L 27/266* (2013.01); *H04L 27/265* (2013.01)

(58) Field of Classification Search
CPC ........ H04L 27/265; H04L 27/266; H04K 1/10
See application file for complete search history.

(56) References Cited

U.S. PATENT DOCUMENTS 7,778,336 B1   8/2010   Toumpakaris et al.

OTHER PUBLICATIONS

Extended European Search Report issued in corresponding European patent application No. 13 30 5195, date of completion of the search Apr. 12, 2013.

(Continued)

*Primary Examiner* — Anez Ebrahim
(74) *Attorney, Agent, or Firm* — The Danamraj Law Group, P.C.; Thomas L. Crisman; Kenneth A. McClure

(57) ABSTRACT

A method and an apparatus determine a time of start of series of OFDM symbols forming an OFDM packet, wherein one or more symbols of the OFDM signal includes a plurality of copies of a short training sequence made of a plurality of time-domain samples. The method includes determining a coarse time index, determining a fine time index, and determining the time of start of each OFDM symbols based on the fine time index. The coarse time-domain sample of the coarse time index is within a coarse estimation error interval, and the time-domain samples of the coarse estimation error interval are converted into frequency domain samples. A metric value is determined for each frequency domain samples, and the fine time index is the time index corresponding to one of the coarse estimation error interval having its associated frequency domain sample having the lowest metric value.

14 Claims, 5 Drawing Sheets

(56) References Cited

OTHER PUBLICATIONS

IEEE Computer Society; "Part 11: Wireless LAN Medium Access Control (MAC) and Physical Layer (PHY) specifications, High-speed Physical Layer in the 5 GHz Band"; IEEE Std 802.11a-1999 (Supplement to IEEE Std 802.11-1999); [Adopted by the ISO/IEC and redesignated as ISO/IEC 8802-11:1999/AMD 1:2000(E); 1999; pp. 1-91.
International Search Report issued in corresponding International application No. PCT/EP2013/074623, date of completion of the search Jan. 20, 2014.
Written Opinion of the International Searching Authority issued in the corresponding International application No. PCT/EP2013/074623, dated Jan. 24, 2014.
Alexander, Tom, "Optimizing and Testing WLANs," Sep. 6, 2007, Newnes, Communications Engineering Series, Oxford, United Kingdom, XP002695344, ISBN: 9780080551128, p. 80.

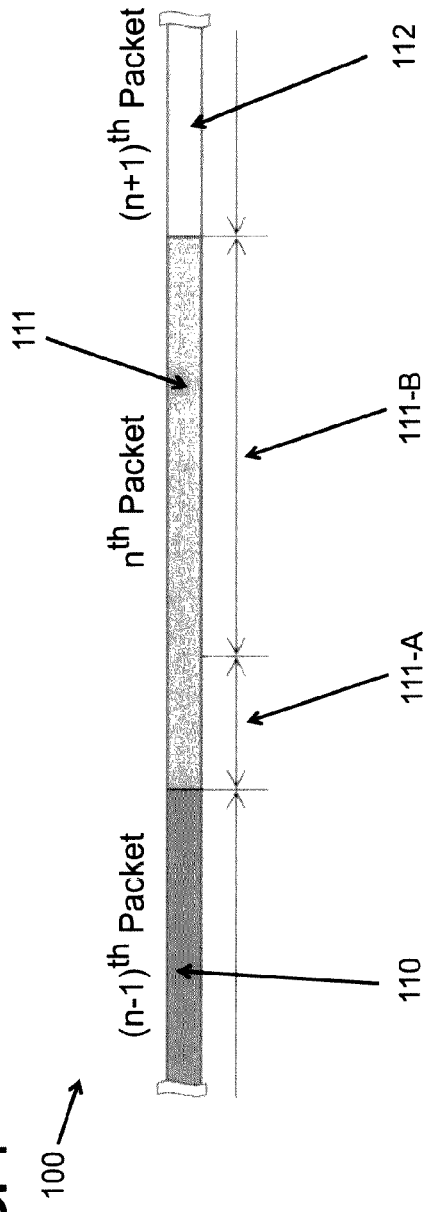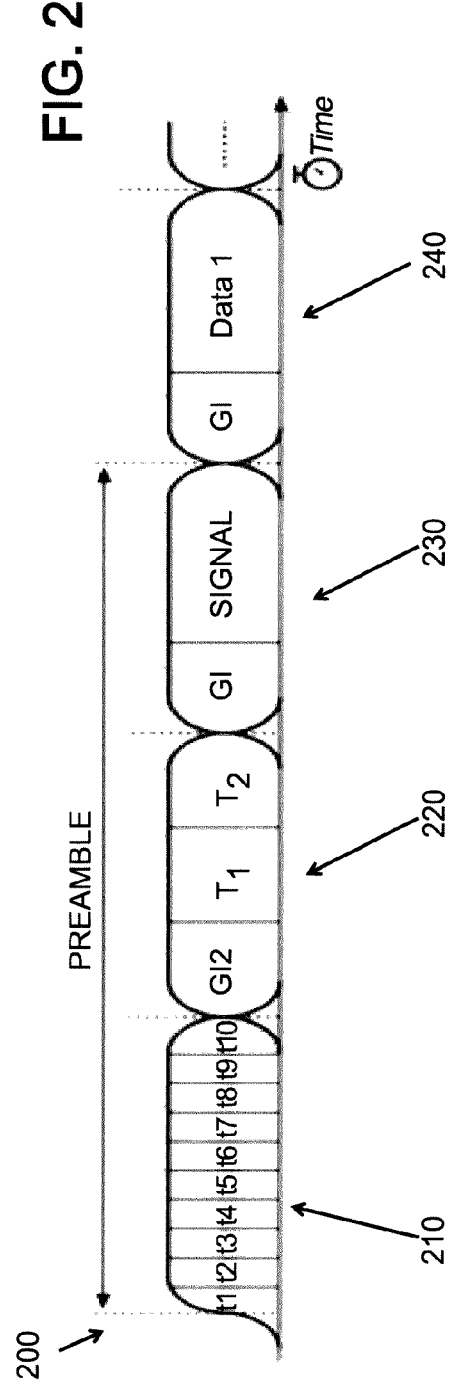

OFDM PACKETS TIME SYNCHRONISATION

TECHNICAL FIELD

The proposed solution relates to demodulation of OFDM signals in a time-varying channel. More particularly, the proposed solution relates to an apparatus and method of performing OFDM time synchronisation in a time-varying channel.

BACKGROUND ART

Orthogonal Frequency Division Multiplexing (OFDM) is a multi-carrier modulation scheme, which has found favour for use, for instance, in optical-based, wire-based (e.g. ADSL) and wireless-based data transfer applications (e.g. IEEE 802.11, WiMAX, UWB, LTE).

This is mainly due to its capability to provide high data rate transmission and also its robustness to multipath delay spread.

However, an OFDM-based communication system is much more sensitive to synchronisation errors than a single carrier system such as GSM communication system.

In fact, the channel through which an OFDM signal is transmitted, such as a time-varying channel, may introduce some noise and unknown signal time delay which may lead to synchronisation mismatches between a transmitter and a receiver of the OFDM-based communication system.

Therefore, time synchronisation is one of the essential functionalities of an OFDM-based communication system which needs to be one of the first operations performed by the receiver when receiving an OFDM signal.

Time synchronisation at the receiver aims at properly delineating a stream of OFDM packets representative of the OFDM signal, in order to avoid inter-symbol interference (ISI) by determining where each OFDM packet starts.

Usually, determining the time of start of an OFDM packet within a stream of OFDM packets representative of an OFDM signal is achieved by performing some operations on one or more of the first OFDM packets.

These operations may comprise the three following steps:
  determining a coarse estimation of the time of start of the subsequent OFDM packets by correlating the incoming one or more of the first OFDM packets based on a plurality consecutive copies of a short training sequence;
  determining a refined estimation of the time of start of the subsequent OFDM packets by correlating the incoming one or more of the first OFDM packets based on a plurality of consecutive copies of a long training sequence comprising more time-domain samples than the short training sequence; and,
  determining the time of start of the subsequent OFDM packets based on the refined estimation results.

However, in conventional time synchronisation techniques, determining where each OFDM packet starts may takes time since it may only be established based on a combination of the received short and long training sequences.

In fact, the correlation results obtained based upon the short training sequence taken alone are not completely reliable but only "coarse".

This is mainly due to the fact the short training sequence has a short duration and thus contains few time-domain samples which may be very sensitive to the noise introduced by the channel through which the OFDM signal is transmitted.

This explains why a "fine" estimation is performed in a second step after determining the "coarse" estimation.

However, such conventional techniques do not comply with OFDM-based communication systems standards wherein time synchronisation is required to be determined as early as possible (e.g. IEEE Standard for WLAN "ISO/IEC 8802-11:1999/Amd 1:2000(E)", p 7 (Section 17.3.2.1), p 12 (Section 17.3.3, FIG. 110) or p 30).

To summarise, determination of the time of start of each OFDM packets forming an OFDM signal as early as possible is not adequately addressed by known techniques.

SUMMARY

The proposed solution allows alleviating the above drawback by providing a time synchronisation technique which may be based on a short training sequence only.

According to a first aspect, there is thus proposed a method of determining, at a receiver of a communication system, the time of start of each of a series of OFDM symbols forming an OFDM packet transmitted over a time-varying channel to the receiver, wherein one or more first OFDM symbols of the OFDM packet comprises a plurality of consecutive copies of a short training sequence, the short training sequence being made of a plurality of time-domain samples.

The method comprises:
  determining a coarse time index indicative of the coarse time of start of the first OFDM symbol subsequent to the one or more first OFDM symbols based on at least the short training sequences of the one or more first OFDM symbols;
  determining a fine time index indicative of the fine time of start of the first OFDM symbol subsequent to the one or more first OFDM symbols wherein the fine time index may be different from the coarse time index; and,
  determining the time of start of each of the series of OFDM symbols forming the OFDM packet based on the fine time index.

The method further comprises:
  the coarse time index and the fine time index respectively corresponding to the time of start of one of the plurality of the time-domain samples;
  a coarse time-domain sample corresponding to the coarse time index being comprised within a coarse estimation error interval ranging from a lower value, corresponding to a number P of time-domain samples situated before the coarse time-domain sample, to an upper value corresponding to a number M of time-domain samples coming after the coarse time-domain sample, wherein P and M values may be different from each other and may be equal to zero;
  the time-domain samples comprised in the coarse estimation error interval being converted into associated frequency domain samples;
  a modulation-quality metric value being determined for each frequency domain samples; and,
  the fine time index being the time index corresponding to one of the coarse estimation error interval having its associated frequency domain sample having the lowest modulation-quality metric value.

A second aspect relates to a computer program product having instructions stored in a computer-readable storage medium, the instructions configured to cause a processor to perform the operations according to the first aspect for determining, at a receiver of a communication system, the time of start of each of a series of OFDM symbols forming an OFDM packet transmitted over a time-varying channel to the receiver, wherein one or more first OFDM symbols of the OFDM packet comprises a plurality of consecutive copies of a short training sequence, the short training sequence being made of a plurality of time-domain samples.

A third aspect relates to an apparatus for determining, at a receiver of a communication system, the time of start of each of a series of OFDM symbols forming an OFDM packet transmitted over a time-varying channel to the receiver, wherein one or more first OFDM symbols of the OFDM packet comprises a plurality of consecutive copies of a short training sequence, the short training sequence being made of a plurality of time-domain samples The apparatus comprises:
an OFDM coarse time synchronisation module configured to determine a coarse time index indicative of the coarse time of start of the first OFDM symbol subsequent to the one or more first OFDM symbols based on at least the short training sequences of the one or more first OFDM symbols;
an OFDM fine time synchronisation module configured to determine a fine time index indicative of the fine time of start of the first OFDM symbol subsequent to the one or more first OFDM symbols wherein the fine time index may be different from the coarse time index;
an OFDM packet delineation module configured to determine the time of start of each of the series of OFDM symbols forming the OFDM packet based on the fine time index; and,
a time-domain to frequency-domain module.

The apparatus further comprises:
the coarse time index and the fine time index respectively correspond to the time of start of one of the plurality of the time-domain samples;
the OFDM fine time synchronisation module being further configured to determine a coarse estimation error interval comprising a coarse time-domain sample corresponding to the coarse time index and ranging from a lower value, corresponding to P time-domain samples situated before the coarse time-domain sample, to an upper value corresponding to M time-domain samples coming after the coarse time-domain sample, wherein P and M values may be different from each other and may be equal to zero;
the time-domain to frequency-domain module being configured to convert the time-domain samples comprised in the coarse estimation error interval into associated frequency domain samples;
the OFDM fine time synchronisation module being further configured to determine a modulation-quality metric value for each frequency domain samples; and,
the OFDM packet delineation module being further configured to determine the fine time index that corresponds to one of the coarse estimation error interval having its associated frequency domain sample having the lowest modulation-quality metric value.

A fourth aspect relates to an OFDM receiver of a communication system, comprising an apparatus according to the third aspect, wherein:
the OFDM receiver is adapted to receive series of OFDM symbols forming an OFDM packet transmitted over a time-varying channel; and,
one or more first OFDM packets of the OFDM packet comprises a plurality of consecutive copies of a short training sequence, the short training sequence being made of a plurality of time-domain samples.

Thus, in embodiments of the proposed solution the above drawbacks of conventional time synchronisation techniques may be alleviated by providing a time synchronisation technique which may be based on a short training sequence only.

The above proposed solution complies with the requirements of communication system standards such as the IEEE 802.11 standard.

This way, for instance in the IEEE 802.11 standard, the time of start of each OFDM symbols of an OFDM packet is determined earlier than with conventional scheme, such that, for instance, post-Fourier transform operations such as channel estimation and equalisation may be performed accurately.

In fact, this way, proper location of samples needed for such operations may be obtained with a good certainty thus improving the output results of such operations.

In fact, this information may be obtained in a quicker way as compared to conventional time synchronisation techniques, since there is no need to wait for the long training sequence to be received in order to obtain the fine time index defining the time of start of the series of OFDM symbols.

In one embodiment, the time-domain samples are converted into associated frequency domain samples via a discrete Fourier transform.

A possible implementation of the discrete Fourier transform may be a Fast Fourier Transform (FFT) method.

In another embodiment, the modulation-quality metric is an un-equalised Error Vector Magnitude, EVM, metric.

One advantage related to this embodiment is the fact that an EVM module is always present on a receiver such that no additional component needs to be implemented, for instance in a receiver, with the proposed solution.

In another embodiment, the coarse estimation error interval preferably ranges from P=5 to M=5 around the coarse time-domain sample.

In yet another embodiment, the time-domain samples and the frequency domain samples are complex samples.

For instance, the complex samples may be two-dimensional complex samples if Quadrature Amplitude Modulation (QAM) is used as the modulation for the subcarriers of an OFDM symbol.

Possibly, the communication system is either one of the following group of communication systems:
a wireless communication system;
an optical communication system; and,
a wired communication system.

Other advantages of the proposed solution comprise the fact that the correlation module that was used in the conventional fine time synchronisation may be deactivated during operation such as channel estimation. This helps reducing the power consumption of the apparatus of the third aspect and the receiver of the fourth aspect of the proposed solution.

BRIEF DESCRIPTION OF DRAWINGS

A more complete understanding of the proposed solution may be obtained from a consideration of the following description in conjunction with the drawings, in which like reference numbers indicate same or similar elements. In the drawings:

FIG. 1 is a block diagram illustrating a time domain structure of an OFDM signal;

FIG. 2 is a block diagram illustrating a time domain structure of an OFDM packet according to the IEEE 802.11 standard;

DESCRIPTION OF EMBODIMENTS

Figure 2A:
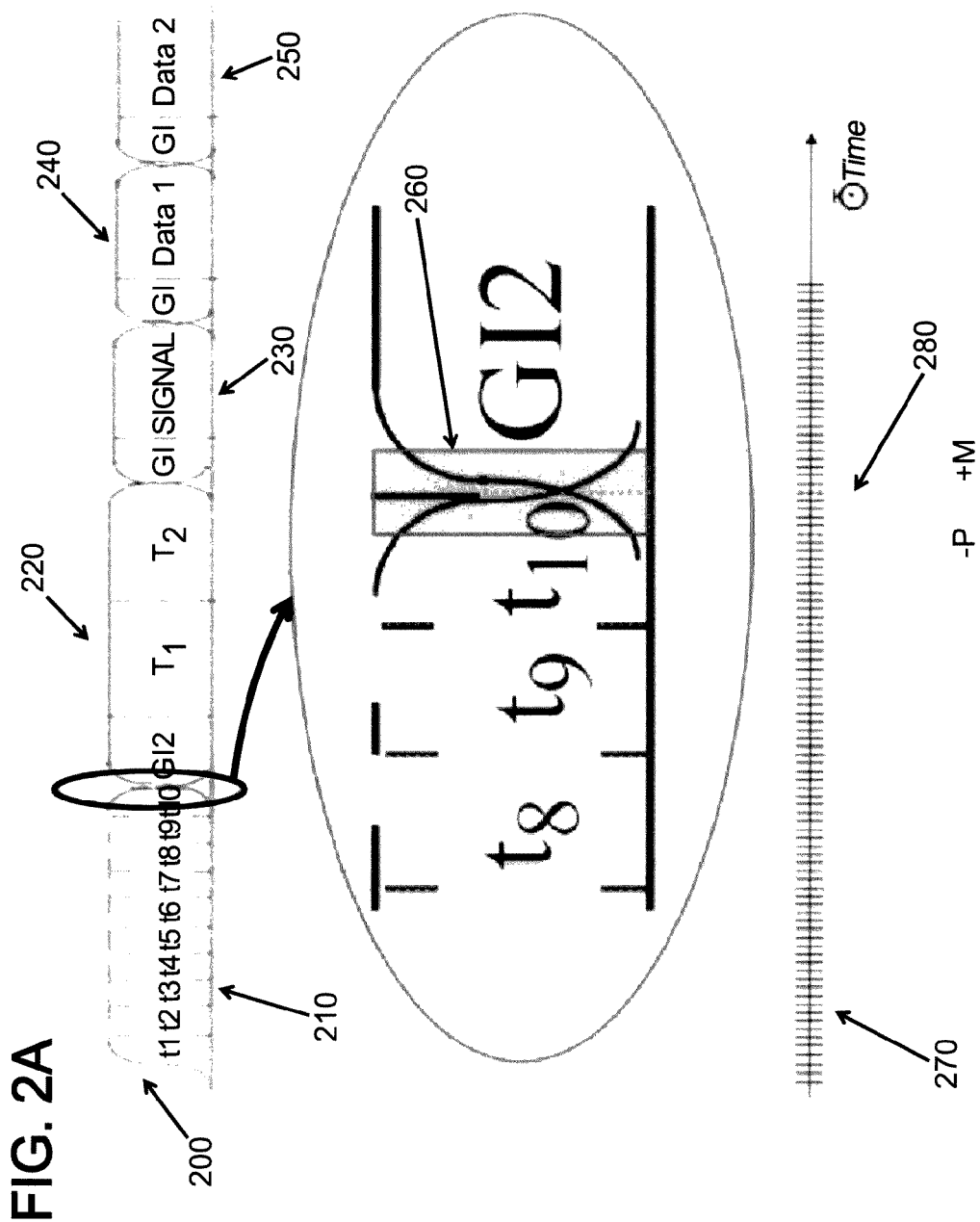
FIG. 2A is a block diagram illustrating a zoom-in view of the OFDM signal of FIG. 2.

FIG. 1 is a block diagram schematically illustrating a time domain structure of an OFDM signal 100 received by a receiver of an OFDM communication system.

The OFDM signal 100 may be a signal, for instance, of an optical-based, wire-based or wireless-based communication system.

In FIG. 1, there is shown therein the OFDM signal 100 comprising a plurality of OFDM packets 110, 111, 112 which are arranged in series, in time order, such that the OFDM packet 110 is situated before the OFDM packet 111 and that the OFDM packet 112 is situated after the OFDM packet 111.

Referring to FIG. 1, each OFDM packet 110, 111, 112 comprises a guard interval portion 111-A and an effective body portion 111-B.

Both the guard interval portion and the effective body portion contain time-domain samples that may be, for instance, complex samples.

The complex samples may have been obtained, for instance, via Inverse Fourier Transform such as an Inverse discrete Fourier transform (IDFT) of the modulation mapping output of digital data transmitted over an OFDM communication system.

For instance, if the digital data is modulated in amplitude and phase, the complex samples may be two-dimensional complex samples.

One should note that the guard interval portion 111-A may be empty.

Thus, an OFDM packet may comprise only the effective body portion 111-B.

Thereinafter, it would be considered as an example, the case of a Wireless Local Area Network (WLAN) communication system. However, it is also in the scope of the proposed solution to encompass the case of other OFDM communication systems that may be, for instance, optical-based, wire-based or wireless-based.

FIG. 2 is a block diagram illustrating a time domain structure of an OFDM packet 200 according to the IEEE 802.11 standard also known as Wi-Fi.

In FIG. 2, there is shown therein the OFDM packet 200 comprising a plurality of OFDM symbols arranged for the purpose of description into OFDM packet portions 210, 220, 230, 240.

The OFDM packet portions are arranged in series, in time order, such that the OFDM packet portion 210 is situated before the OFDM packet portion 220, the OFDM packet portion 230 is situated after the OFDM packet portion 220 and the OFDM packet portion 240 is situated after the OFDM packet portion 230.

Therefore, one should understand that the OFDM packet portion 210 is the first packet portion, in time order, of the OFDM packet 200.

Each OFDM packet portion 210, 220, 230, 240 may comprise one or more OFDM symbols wherein each OFDM symbol may comprise one or more time-domain samples that may be, for instance, complex samples as already described above.

One should note that the OFDM packet 200 has substantially the same structure as the one depicted in FIG. 1.

Namely, the OFDM packet 200 comprises a guard interval portion 210, 220, 230 and an effective body portion 240.

Referring to FIG. 2, the OFDM packet 200 starts with a PREAMBLE section comprising the OFDM packet portions 210, 220 and 230.

The above arrangement may be in accordance with the physical layer protocols of the IEEE 802.11 standard.

The PREAMBLE section comprises ten short training sequences $t_1, t_2, t_3, t_4, t_5, t_6, t_7, t_8, t_9, t_{10}$ with identical content and situated in the OFDM packet portion 210.

With the example of the IEEE 802.11 standard, the packet portion 210 may comprise two OFDM symbols.

The PREAMBLE section also comprises two long training sequences $T_1, T_2$ with identical content situated in the OFDM packet portion 220.

The PREAMBLE section further comprises a guard interval GI2 next to the long training sequences $T_1, T_2$ situated at the beginning of the OFDM packet portion 220.

With the example of the IEEE 802.11 standard, the packet portion 220 may comprise two OFDM symbols.

According to the IEEE 802.11 standard, each short training sequence comprises 16 time-domain samples and each long training sequence comprises 64 time-domain samples.

As described above, the time-domain samples may be complex samples that may have been obtained, for instance, via an Inverse Fourier Transform such as an Inverse discrete Fourier transform (IDFT) of the modulation mapping output of a digital data transmitted over an OFDM communication system.

In the literature, GI2 may be known as the "cyclic prefix" (CP).

Additionally, GI2 aims at protecting the long training sequence from intersymbol interference (ISI) when the channel, through which the OFDM packet 200 is transmitted, is subject to time variations such as multipath fading or signal time delay.

According to the IEEE 802.11 standard, the GI2 comprises a copy of the last 32 time-domain samples of the long training sequence $T_1$.

Therefore, the OFDM packet portion 210 contains 160 time-domain samples (i.e. 10×16=160) and the OFDM packet portion 220 also contains 160 time-domain samples (i.e. 32+64×2=160).

The OFDM packet portions 210 and 220, each comprise two OFDM symbol, since an OFDM packet comprise 80 time-domain samples according to the IEEE 802.11 standard.

The PREAMBLE section further comprises a guard interval GI next to a SIGNAL field, both being situated in the OFDM packet portion 230.

In the literature, GI may be known as the "cyclic prefix" (CP) as already explained above.

The SIGNAL field is mainly used to indicate the current data rate and the number of bits contained in the OFDM packet 200.

With the example of the IEEE 802.11 standard, the packet portion 230 may comprise two OFDM symbols.

According to the IEEE 802.11 standard, the OFDM packet portions 230 has 80 time-domain samples (i.e. one OFDM packet) in total wherein the guard interval GI comprises 16 time-domain samples situated at the beginning of each OFDM packet portion 230.

Following the PREAMBLE section, it may be found the OFDM packet portion 240 which is having 80 time-domain samples (i.e. one OFDM packet) in total wherein the guard interval GI packet portion 240 comprises 16 time-domain samples situated at the beginning of each OFDM packet portion 240.

According to the IEEE 802.11 standard, the OFDM packet portion 240 comprises the field "DATA 1" that correspond to transmitted data information from a transmitter to a receiver.

The IEEE 802.11 standard implicitly indicates that the maximum time of performing signal detection and Automatic Gain Control (AGC) should be less than the time duration of the first seven short training sequences of the OFDM packet portion 210.

Signal detection is the operation of identifying a weak received OFDM packet 200 within the noise introduced by channel through which it may have been being transmitted. The term 'weak' means that the level of the OFDM packet 200 is substantially smaller compared to the level of the noise.

AGC is the operation of automatically adjusting the average level of the received OFDM packet 200 in order to maintain it substantially constant.

The IEEE 802.11 standard also indicates that after signal detection and AGC operations are completed, time synchronisation should start and should be completed before the first long training sequence $T_1$.

After time synchronisation is performed, the IEEE 802.11 standard indicates, as a guideline, that the long training sequences $T_1$, $T_2$ should be utilised for channel estimation.

Therefore, one should understand that time synchronisation is recommended to be performed based on the short training sequences $t_1$, $t_2$, $t_3$, $t_4$, $t_5$, $t_6$, $t_7$, $t_8$, $t_9$, $t_{10}$ only, whereas channel estimation is recommended to be performed based on the long training sequences $T_1$, $T_2$.

Unfortunately, conventional time synchronisation techniques are mainly based on a combination of the short and long training sequences.

Namely, as explained above, a coarse time synchronisation may be performed first, based on the short training sequences and then a fine time synchronisation may be performed based on the long training sequence to fine tune the coarse estimation resulting from the coarse time synchronisation.

Coarse time synchronisation and fine time synchronisation, both usually make use of correlations operations in order to determine the right timing of the each OFDM packet forming the OFDM signal.

For instance, coarse time synchronisation may be done by performing an auto-correlation of the OFDM packet portion 210 with a delayed version of the OFDM packet portion 210. The applied delay corresponds, for instance, to the duration of one short training sequence. Later, based on the obtained auto-correlation peaks for each short training sequence of the OFDM packet portion 210, a coarse estimate of the time of start of the OFDM packets forming the OFDM packet portion 220 may be derived.

For instance, the time of start of GI2 may be determined based on the coarse estimate.

However, the coarse estimate is a result which is not precise enough for OFDM packet 200 travelling through time-varying channels that may experience multipath and low signal to noise ratios (SNR).

Therefore fine time synchronisation may be required in addition to coarse estimation.

Fine time synchronisation is done, for instance, by performing a cross-correlation of the OFDM packet portion 220, with a predefined long training sequence known by the receiver. Later, based on the obtained cross-correlation peaks for each long training sequence, a fine estimate of the time of start of the OFDM packets forming the OFDM packet portion 220 and also of the subsequent OFDM packet portion 230, 240 and 250 may be derived.

To summarise, conventional time synchronisation techniques are mainly based on the correlation operations performed on the short training sequences $t_1$, $t_2$, $t_3$, $t_4$, $t_5$, $t_6$, $t_7$, $t_8$, $t_9$, $t_{10}$ and on the long training sequences $T_1$, $T_2$.

This situation is not appropriate since long training sequences $T_1$, $T_2$ are only recommended to be used for channel estimation operation as indicated in the IEEE 802.11 standard.

The proposed solution allows alleviating the above drawback by providing a time synchronisation technique which may only be based on the short training sequences $t_1$, $t_2$, $t_3$, $t_4$, $t_5$, $t_6$, $t_7$, $t_8$, $t_9$, $t_{10}$.

FIG. 2A is a block diagram schematically illustrating a zoom-in view of the OFDM packet 200.

Namely, in FIG. 2A, there is shown therein a zoom-in view of the end of the OFDM packet portion 210 and the beginning of the OFDM packet portion 220.

It is also shown therein, a time index line 270 comprising time indices wherein each time index is associated with the time of start of a time-domain sample of the OFDM packet 200.

The increment from a time index to the subsequent index corresponds to a sample period (i.e. the duration of a time-domain sample).

According to simulation results, a coarse time index associated with the coarse estimate derived from the coarse time synchronisation as described above may regularly deviate from the fine time index 280 corresponding to the fine estimate derived from the fine time synchronisation as described above, for the reason already explained above.

However, it has been found that that the fine time index 280 is always comprised in a coarse estimation error interval 260 around the coarse time index.

Namely, it has been found that the coarse estimation error interval 260 may range with given bounds from a lower value, corresponding to a number P of time indices situated before the coarse time index, to an upper value corresponding to a number M of time indices coming after the coarse time index, wherein P and M values may be different from each other and also may by equal to zero.

For instance, the following values may be used: P=5 and M=5.

In FIG. 2, it is shown the case where the coarse time index is equal to the fine time index.

However, the coarse estimation error interval 260 may be located elsewhere in the OFDM packet 200, depending on the coarse time index derived from the coarse time synchronisation as described above.

It has been found that converting the time-domain samples of the coarse estimation error interval 260 into frequency-domain samples via, for instance an implementation of the discrete Fourier Transform (DFT), it may be possible to compute, for instance, a quality metric of each frequency-domain samples.

That quality metric may encompasses all the sources of errors which are introduced during the transmission process and that the receiver would have to deal with while demodulating the OFDM packet 200.

This kind of quality metric may help assessing the quality of the coarse time index compared to the other time index of the time-domain samples situated in the coarse estimation error interval 260.

For instance, a metric of modulation quality may be used to help performing such assessment.

As it is known for one of ordinary skill in the art of OFDM communication systems, frequency-domain samples content may utilise some variant of Quadrature Amplitude Modulation (QAM) that modulates subcarriers of an OFDM symbol by altering amplitude and phase.

Thus, for instance, a standard metric measurement such as the Error Vector Magnitude (EVM) may be used to determine the quality and the degree of signal impairments of the frequency-domain samples associated with the time-domain samples of the coarse estimation error interval 260 and corresponding to the short training sequences.

In fact, the EVM metric may measure and quantify the error signals of frequency-domain samples by encompassing a plethora of error factors, such as:

random noise (both amplitude and phase) introduced by amplifiers, mixers and oscillators;
conversion errors in the digital to converters (DACs);
distortion throughout the transmission chain;
mixer spurious signals;
digital signal processing errors;
offsets and imbalance in quadrature mixers;
time synchronization errors that induce intersymbol interferences; and,
frequency synchronization errors that induce intersymbol interferences Hence, by computing the EVM metric for each frequency-domain sample associated with a time-domain sample of the coarse estimation error interval 260, it may be possible to identify the fine time index 280.

In fact, the fine time index 280 may be equal to the time index associated with the lowest EVM metric value out of the EVM metric values calculated based on the frequency-domain samples associated with the time-domain samples of the coarse estimation error interval 260 and corresponding to the short training sequences.

In fact, excessive EVM metric values may point-up the fact that the original short training sequence cannot be successfully recovered whereas low EVM metric values may indicate that the original short training sequence may be recovered with a sound likelihood.

One should note that the EVM calculation of the proposed solution may be performed before the equalisation operation may be performed.

Thus it may be an unequalised EVM calculation that may be performed on the frequency-domain samples.

After identifying the fine time index based on the short training sequences only, it may be possible to determine the time of start of each OFDM packets subsequent to the OFDM section 210 of the OFDM packet 200.

In the following, it is described in further detail hardware/software embodiments of OFDM time synchronisation.

Figure 3:
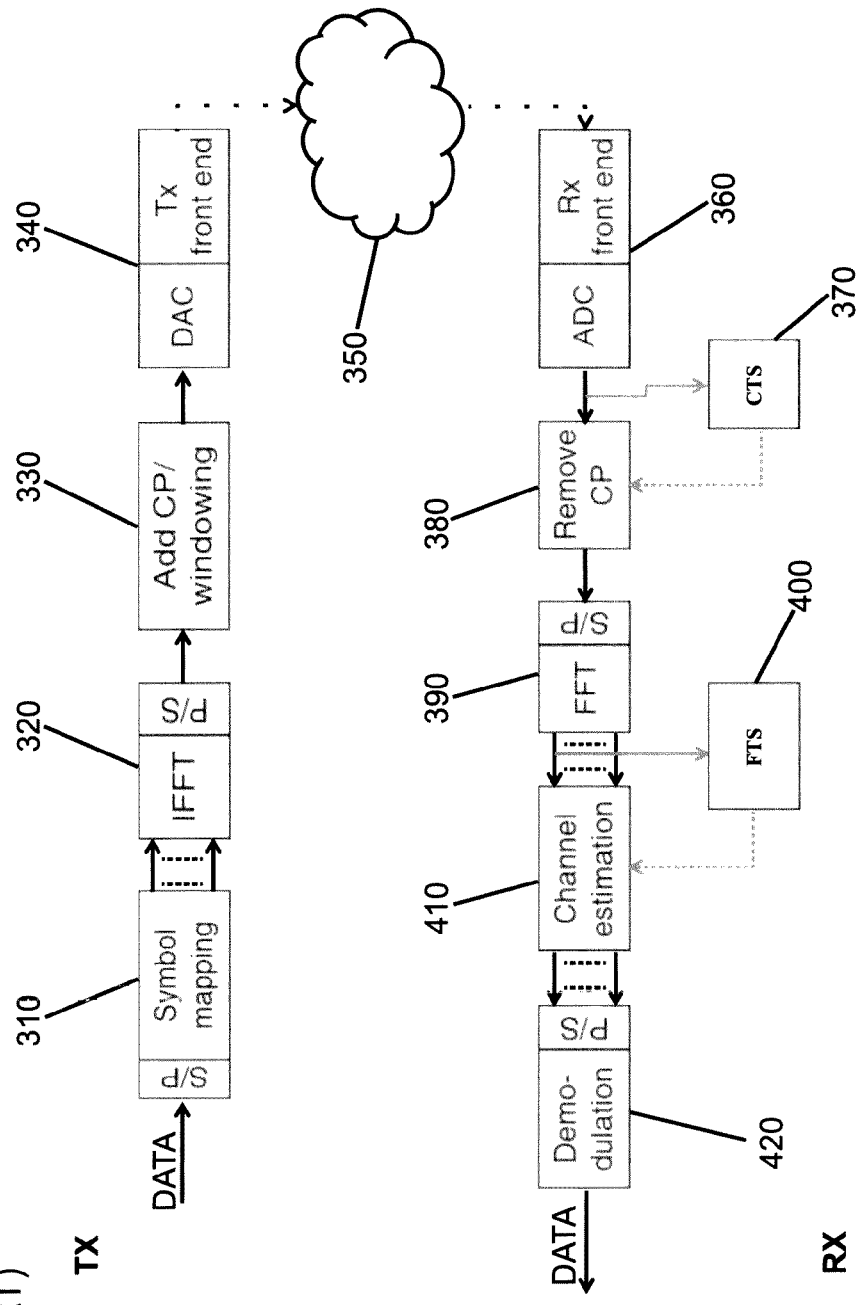
FIG. 3 is a block diagram illustrating a prior art implementation of OFDM time synchronisation.

FIG. 3 is a block diagram schematically illustrating a prior art implementation an OFDM time synchronisation.

In FIG. 3, there is shown therein an OFDM transmission chain comprising an OFDM transmitter TX and an OFDM receiver RX.

At the transmitter level TX, there is an input digital DATA such as a series of bits which represents an information to be transmitted from the transmitter TX to the receiver RX.

First, in the unit 310, the DATA is converted from series to parallel groups of bits using a serial to parallel (S/P) operation. Each of the parallel groups of bits is mapped into a two-dimensional complex value, for instance using Gray coding, thus creating parallel two-dimensional complex values.

In the unit 320, the parallel two-dimensional complex values are converted into a time-domain OFDM symbol via an inverse Fourier Transform implementation (IFFT) wherein each two-dimensional complex value is converted into time-domain samples.

Stated differently, frequency-domain samples corresponding to the two-dimensional complex values are converted into time-domain samples.

Further, the parallel time-domain samples are converted into a series of time-domain samples using a parallel to serial (P/S) operation.

In the unit 330, the series of time-domain samples is extended with a guard interval, thus creating an OFDM packet comprising the guard interval and the series of time-domain samples.

One should remember that such OFDM packet may comprise 80 time-domain samples according to IEEE 802.11 standard.

In the unit 340, a plurality of successive OFDM packets enter into a digital to analog converter (DAC). In the DAC, each of the time-domain samples of each entering OFDM packet is converted from digital to analog, thus creating an OFDM signal. The OFDM signal is further adapted for transmission by the Tx front end in order to be properly transmitted through the channel 350.

For instance, the channel 350 may be wired, optical or wireless.

At the receiver level RX, in the unit 360, the received OFDM signal is properly adapted for reception by the Rx front end and converted into a plurality of OFDM packets using the analog to digital converter (ADC).

In the unit 370, a coarse time synchronisation (CTS) may be performed as explained above in order to obtain a coarse time index. As explained above also, the OFDM symbols comprising the short training sequences are exploited by the CTS operation.

In the unit 380, the coarse time index may be used to determine where the guard interval of the subsequent OFDM packets starts in order to discard it.

In the unit 390, the remaining series of time-domain samples (i.e. excluding the guard interval) of each OFDM packet is converted from series to parallel time-domain samples using a serial to parallel (S/P) operation.

The parallel time-domain samples are further converted into parallel two-dimensional complex values via a discrete Fourier Transform implementation (FFT).

One should note that the operation of unit 390 may be performed at the symbol rate.

The above statement means that the processing of the series of time-domain samples and corresponding parallel two-dimensional complex values may be performed by considering an amount of, series of time-domain samples or corresponding parallel two-dimension complex values, that corresponds to the number of time-domain samples present within an OFDM packet in the time domain.

For instance, in the IEEE 802.11 standard, 80 time-domain samples or corresponding frequency-domain samples are processed at a time.

In the unit 400, a fine time synchronisation (FTS) may be performed as explained above in order to obtain a fine time index. As explained above, the parallel two-dimensional complex values corresponding to the long training sequences are exploited by the FTS.

In the unit 410, the fine time index is used to determine where starts the guard interval of the subsequent OFDM packets is in order to discard it and also in order to perform subsequent operations such as the channel estimation operation. As explained above, the parallel two-dimensional complex values corresponding to the long training sequences are exploited by the channel estimation operation.

Then, in unit 420, the parallel two-dimensional complex values are converted into a series of two-dimensional complex values using a parallel to serial (P/S) operation. The series of two-dimensional complex values is further demodulated in order to obtain the DATA they contain.

Figure 4:
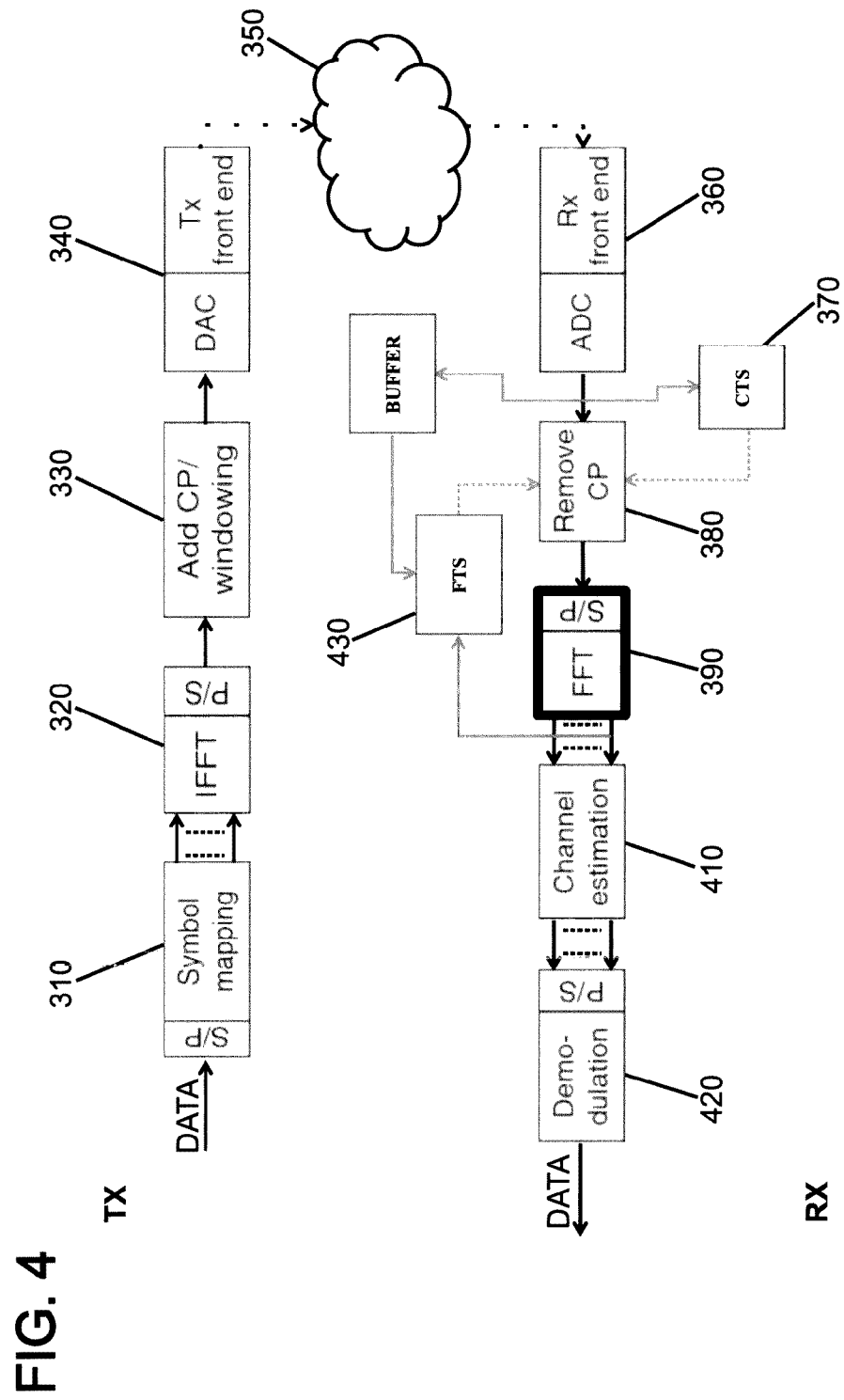
FIG. 4 is a block diagram illustrating an implementation of OFDM time synchronisation according to proposed embodiments.

FIG. 4 is a block diagram schematically illustrating an implementation of OFDM time synchronisation according to proposed embodiments.

In FIG. 4, there is shown therein an OFDM transmission chain comprising an OFDM transmitter TX and an OFDM receiver RX.

At the transmitter level TX, there may be an input digital DATA such as a series of bits which represents an information to be transmitted from the transmitter TX to the receiver RX.

First, in the unit 310, the DATA may be converted from series to parallel groups of groups of bits using a serial to parallel (S/P) operation. Each of the parallel groups of bits may be mapped into a two-dimensional complex value, for instance using Gray coding, thus creating parallel two-dimensional complex values.

In the unit 320, the parallel two-dimensional complex values may be converted into a time-domain OFDM symbol via an inverse Fourier Transform implementation (IFFT) wherein each two-dimensional complex value is converted into time-domain samples.

Stated differently, frequency-domain samples corresponding to the two-dimensional complex values may be converted into time-domain samples.

Further, the parallel time-domain samples may be converted into a series of time-domain samples using a parallel to serial (P/S) operation.

In the unit 330, the series of time-domain samples may be extended with a guard interval, thus creating an OFDM packet comprising the guard interval and the series of time-domain samples.

One should remember that such OFDM packet may comprise 80 time-domain samples according to IEEE 802.11 standard.

In the unit 340, a plurality of successive time-domain consecutive OFDM packets may enter into a digital to analog converter (DAC). In the DAC, each of the time-domain samples time samples of each entering OFDM packet may be converted from digital to analog, thus creating an OFDM signal. The OFDM signal may be further adapted for transmission by the Tx front end in order to be properly transmitted through the channel 350.

For instance, the channel 350 may be wired, optical or wireless.

The channel 350 may be a time-varying channel experiencing multipath and low signal to noise ratios (SNR) which may introduce some noise and unknown signal time delay to the OFDM.

These channel impairments may lead to time synchronisation mismatches between the transmitter TX and the receiver RX.

At the receiver level RX, in the unit 360, the received OFDM signal may be properly adapted for reception by the Rx front end and converted into a plurality of OFDM packets using the analog to digital converter (ADC).

In the unit 370, a coarse time synchronisation (CTS) may be performed as explained above in order to obtain a coarse time index. As explained above also, the OFDM packets comprising the short training sequences may be exploited by the CTS operation.

In the unit 380, the coarse time index may be used to determine where the guard interval of the subsequent OFDM packets starts in order to discard it.

In the unit 390, the remaining series of time-domain samples (i.e. excluding the guard interval) of each OFDM packet may be converted from series to parallel time-domain samples using a serial to parallel (S/P) operation.

The parallel time-domain samples may be further converted into parallel two-dimensional complex values via a Fourier Transform implementation (FFT).

One should note that, contrary to conventional techniques described above, the operation of unit 390 may be performed at the sample rate instead of the symbol rate.

The above statement means that the processing of the series of time-domain samples and corresponding parallel two-dimensional complex values may be performed by considering an amount of, series of time-domain samples or corresponding parallel two-dimensional complex values that corresponds to one time-domain sample.

Hence, for instance, in the IEEE 802.11 standard, each of the 64 time-domain samples or corresponding frequency-domain samples (after guard interval removal) are processed at the pace of a single time-domain sample at a time.

This oversampling of the operation of unit 390 may persist only during the operations of determining of the time of start of the subsequent OFDM packets. After that period, the operation of unit 390 may be performed at the symbol rate as described above for the conventional time synchronisation techniques.

Thus, in the unit 430, a fine time synchronisation (FTS) according to the proposed solution may be performed as explained above in order to obtain the fine time index.

Namely, an unequalised modulation-quality metric value, such as an unequalised EVM metric value, may be computed for each frequency-domain sample corresponding to a time-domain sample of the coarse estimation error interval.

As explained above also, the parallel two-dimensional complex values corresponding to the short training sequences may be exploited by the FTS according to the proposed solution.

After the operations of unit 430, the process may return to the unit 380 wherein the fine time index may be used to determine where the subsequent OFDM packets start.

Since the operations unit 430 may be loop backed to the unit 380, the subsequent OFDM packets may be put on hold into a BUFFER until their proper start is determined based on the obtained fine time index.

In the unit 410, the parallel two-dimensional complex values (i.e. the frequency-domain sample) corresponding to the time-domain samples associated to the long training sequences are only exploited during the channel estimation operation.

Contrary to the conventional time synchronisation techniques, the long training sequences may no long be used for time synchronisation determination.

Then, in unit 420, the parallel two-dimensional complex values may be converted into a series of two-dimensional complex values using a parallel to serial (P/S) operation. The series of two-dimensional complex values may be further demodulated in order to obtain the DATA they contain.

Figure 5:
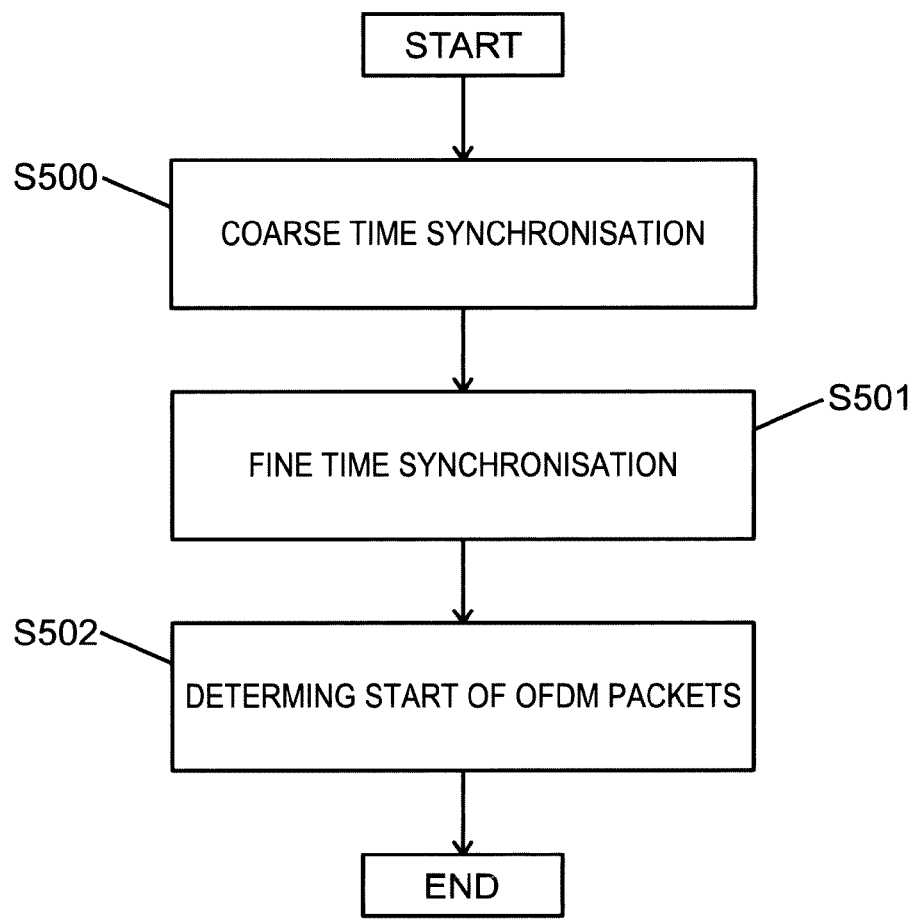
FIG. 5 is a flow chart illustrating embodiments according to the proposed solution.

FIG. 5 is a flow chart schematically illustrating embodiments according to the proposed solution.

In S500, it may be obtained the coarse time index as already described above using the conventional coarse time synchronisation.

In S501, it may be obtained the fine time index as already described above using the fine time synchronisation of the proposed solution.

In S502, it may be determined the time of start of the subsequent OFDM symbol based on the fine time index as already described above.

A computer program product having instructions stored in a computer-readable storage medium, the instructions configured to cause a processor to perform the operations of a method for determining, at a receiver of a communication system, the time of start of series of OFDM packets forming an OFDM signal transmitted over a time-varying channel to the receiver, wherein one or more first OFDM packets of the OFDM signal comprises a plurality of consecutive copies of a short training sequence, the short training sequence being made of a plurality of time-domain samples.

An apparatus may be realized according to the proposed solution.

An OFDM receiver of a communication system, comprising the apparatus, wherein:
the OFDM receiver is adapted to receive series of OFDM packets forming an OFDM signal transmitted over a time-varying channel: and,
one or more first OFDM packets of the OFDM signal comprises a plurality of consecutive copies of a short training sequence, the short training sequence being made of a plurality of time-domain samples.

Although the proposed solution is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the proposed solution, whether or not such embodiments are described and whether or not such features are presented as being a part of a described embodiment. Thus, the breadth and scope of the present proposed solution should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more, least," "but not limited to" or other like phrases in some instances shall not be read to mean that the narrower case is intended or required in instances where such broadening phrases may be absent. Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. These illustrations and their accompanying description should not be construed as mandating a particular architecture or configuration.

The invention claimed is:

1. A method for performing time synchronization at a receiver of a communication system by determining a time of start of each of a series of Orthogonal Frequency Division Multiplexing (OFDM), symbols forming an OFDM packet transmitted over a time-varying channel to the receiver, wherein one or more first OFDM symbols of the OFDM packet includes a plurality of consecutive copies of a short training sequence, the short training sequence being made of a plurality of time-domain samples, the method comprising:
determining a coarse time index indicative of a coarse time of start of a first OFDM symbol subsequent to the one or more first OFDM symbols based on at least the short training sequences of the one or more first OFDM symbols;
determining a fine time index indicative of a fine time of start of the first OFDM symbol subsequent to the one or more first OFDM symbols; and,
determining a time of start of each of the series of OFDM symbols forming the OFDM packet based on the fine time index in order to determine where ones of the series of OFDM packets start;
wherein:
the coarse time index and the fine time index correspond to times of start of one of the plurality of the time-domain samples, respectively;
a coarse time-domain sample corresponding to the coarse time index is comprised within a coarse estimation error interval ranging from a lower value, corresponding to a number P of time-domain samples situated before the coarse time-domain sample, to an upper value corresponding to a number M of time-domain samples coming after the coarse time-domain sample;
the time-domain samples comprised in the coarse estimation error interval are converted into associated frequency domain samples;
a modulation-quality metric value is determined for each frequency domain samples; and,
the fine time index is a time index corresponding to one of the coarse estimation error interval samples having an associated frequency domain sample having the lowest modulation-quality metric value.

2. The method of claim 1, wherein the time-domain samples are converted into the associated frequency domain samples via a discrete Fourier transform.

3. The method of claim 1, wherein the modulation-quality metric is an un-equalized Error Vector Magnitude, EVM, metric.

4. The method of claim 1, wherein the coarse estimation error interval ranges from P=5 to M=5 around the coarse time-domain sample.

5. The method of claim 1, wherein the time-domain samples and the frequency domain samples are complex samples.

6. The method of claim 1, wherein the communication system is one of the following group of communication systems:
- a wireless communication system;
- an optical communication system; and,
- a wired communication system.

7. A non-transitory computer-readable storage medium storing executable codes which when executed by a processor make the processor perform operations of a method for performing time synchronization at a receiver of a communication system by determining a time of start of each of a series of Orthogonal Frequency Division Multiplexing (OFDM) symbols forming an OFDM packet transmitted over a time-varying channel to the receiver, wherein one or more first OFDM symbols of the OFDM packet includes a plurality of consecutive copies of a short training sequence, the short training sequence being made of a plurality of time-domain samples, the method comprising:
- determining a coarse time index indicative of a coarse time of start of a first OFDM symbol subsequent to the one or more first OFDM symbols based on at least the short training sequences of the one or more first OFDM symbols;
- determining a fine time index indicative of a fine time of start of the first OFDM symbol subsequent to the one or more first OFDM symbols wherein the fine time index may be different from the coarse time index; and,
- determining a time of start of each of the series of OFDM symbols forming the OFDM packet based on the fine time index in order to determine where ones of the series of OFDM packets start;

wherein:
- the coarse time index and the fine time index correspond to times of start of one of the plurality of the time-domain samples, respectively;
- a coarse time-domain sample corresponding to the coarse time index is comprised within a coarse estimation error interval ranging from a lower value, corresponding to a number P of time-domain samples situated before the coarse time-domain sample, to an upper value corresponding to a number M of time-domain samples coming after the coarse time-domain sample;
- the time-domain samples comprised in the coarse estimation error interval are converted into associated frequency domain samples;
- a modulation-quality metric value is determined for each frequency domain samples; and,
- the fine time index is a time index corresponding to one of the coarse estimation error interval samples having an associated frequency domain sample having the lowest modulation-quality metric value.

8. An apparatus for performing time synchronization at a receiver of a communication system by determining a time of start of each of a series of Orthogonal Frequency Division Multiplexing (OFDM) symbols forming an OFDM packet transmitted over a time-varying channel to the receiver, wherein one or more first OFDM symbols of the OFDM packet includes a plurality of consecutive copies of a short training sequence, the short training sequence being made of a plurality of time-domain samples, the apparatus comprising:
- a processor coupled to a computer-readable storage medium storing instructions that when executed by the processor make the processor perform operations of a method, the method comprising:
  - determining a coarse time index indicative of a coarse time of start of a first OFDM symbol subsequent to the one or more first OFDM symbols based on at least the short training sequences of the one or more first OFDM symbols;
  - determining a fine time index indicative of a fine time of start of the first OFDM symbol subsequent to the one or more first OFDM symbols; and
  - determining a time of start of each of the series of OFDM symbols forming the OFDM packet based on the fine time index in order to determine where ones of the series of OFDM packets start;

wherein:
- the coarse time index and the fine time index correspond to times of start of one of the plurality of the time-domain samples, respectively;
- a coarse time-domain sample corresponding to the coarse time index is comprised within a coarse estimation error interval ranging from a lower value, corresponding to P time-domain samples situated before the coarse time-domain sample, to an upper value corresponding to M time-domain samples coming after the coarse time-domain sample;
- the time-domain samples comprised in the coarse estimation error interval are converted into associated frequency domain samples;
- a modulation-quality metric value is determined for each frequency domain samples; and,
- the fine time index is a time index corresponding to one of the coarse estimation error interval samples having an associated frequency domain sample having the lowest modulation-quality metric value.

9. The apparatus of claim 8, wherein the conversion of the time-domain samples to frequency-domain samples is based on a discrete Fourier Transform.

10. The apparatus of claim 8, wherein the modulation-quality metric is an un-equalized Error Vector Magnitude, EVM, metric.

11. The apparatus of claim 8, wherein the coarse estimation error interval ranges from P=5 to M=5 around the coarse time-domain sample.

12. The apparatus of claim 8, wherein the time-domain samples and the frequency domain samples are complex samples.

13. The apparatus of claim 8, wherein the communication system is one of the following group of communication systems:
- a wireless communication system;
- an optical communication system; and,
- a wired communication system.

14. An Orthogonal Frequency Division Multiplexing (OFDM) communication system, comprising:
- an OFDM transmitter; and
- an OFDM receiver, the OFDM receiver comprising a processor coupled to a computer storage medium storing instructions that when executed by the processor make the processor perform operations of a method for performing time synchronization at the receiver, the method comprising:
  - determining a coarse time index indicative of a coarse time of start of a first OFDM symbol subsequent to the one or more first OFDM symbols based on at least the short training sequences of the one or more first OFDM symbols;
  - determining a fine time index indicative of a fine time of start of the first OFDM symbol subsequent to the one or more first OFDM symbols; and
  - determining a time of start of each of the series of OFDM symbols forming the OFDM packet based on the fine time index in order to determine where ones of the series of OFDM packets start;
wherein:
the coarse time index and the fine time index correspond to times of start of one of the plurality of the time-domain samples, respectively;
a coarse time-domain sample corresponding to the coarse time index is comprised within a coarse estimation error interval ranging from a lower value, corresponding to P time-domain samples situated before the coarse time-domain sample, to an upper value corresponding to M time-domain samples coming after the coarse time-domain sample;
the time-domain samples comprised in the coarse estimation error interval are converted into associated frequency domain samples;
a modulation-quality metric value is determined for each frequency domain samples; and,
the fine time index is a time index corresponding to one of the coarse estimation error interval samples having an associated frequency domain sample having the lowest modulation-quality metric value;
the OFDM receiver is adapted to receive series of OFDM symbols forming an OFDM packet transmitted over a time-varying channel; and,
one or more first OFDM packets of the OFDM packet comprises a plurality of consecutive copies of a short training sequence, the short training sequence being made of a plurality of time-domain samples.

* * * * *